United States Patent [19]

Dutton et al.

[11] Patent Number: 4,713,751
[45] Date of Patent: Dec. 15, 1987

[54] MASKING COMMANDS FOR A SECOND PROCESSOR WHEN A FIRST PROCESSOR REQUIRES A FLUSHING OPERATION IN A MULTIPROCESSOR SYSTEM

[75] Inventors: Patrick F. Dutton, Endicott; Earl W. Jackson, Jr., Apalachin, both of N.Y.

[73] Assignee: International Business Machines Corporation, Armonk, N.Y.

[21] Appl. No.: 664,283

[22] Filed: Oct. 24, 1984

[51] Int. Cl.⁴ .............................................. G06F 13/32
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,268,904 | 5/1981 | Suzuki | 364/200 |
| 4,275,440 | 6/1981 | Adams, Jr. | 364/200 |
| 4,394,730 | 7/1983 | Suzuki et al. | 364/200 |
| 4,400,773 | 8/1983 | Brown | 364/200 |
| 4,494,193 | 1/1985 | Brahm | 364/200 |

Primary Examiner—Raulfe B. Zache
Assistant Examiner—Emily Y. Chan
Attorney, Agent, or Firm—Curtis G. Rose; J. H. Bouchard; M. H. Klitzman

[57] ABSTRACT

A masking circuit for a multiprocessor system is disclosed. The masking circuit senses the existence and type of commands stored in the command status registers associated with the system processors. Masking begins if it is determined that information needed by one processor is located in the cache memory of another processor and is to be flushed to the main memory, which is accessible by the first processor. The masking circuit masks the command present in the command status register associated with the first processor, for the first processor to access the main memory, until after the information has been flushed from the cache to the main memory. The first processor is thus prevented from accessing the main memory until after the information has been flushed thereto.

5 Claims, 15 Drawing Figures

FIG. 12

IPU 0 10A: READ 0123 | READ 0123 | IPU FNCTN/READ 0123 | IPU FNCTN/READ 0123 | WRITE 012345 | READ 01230123 | READ 0123 | — 0

IPU 1 20A: READ 0123 | IPU FNCTN/READ 0123 | WRITE 012345 | READ 01230123 | IPU FNCTN/READ 0123 | WRITE 012345 | READ 0123 | — 0

BSM CTRLS 30: 0123 0123 0123 0123 0123 0123 0123 0

OUT-OF-SYNC SITUATION

IN-SYNC SITUATION

MASKING COMMANDS FOR A SECOND PROCESSOR WHEN A FIRST PROCESSOR REQUIRES A FLUSHING OPERATION IN A MULTIPROCESSOR SYSTEM

BACKGROUND OF THE INVENTION

The present invention relates to multiprocessor computer technology, and more particularly, to a masking circuit within a multiprocessor computer system for masking the contents of a first command status register, associated with a first processor, from the multiprocessor system until the contents of a second command status register, associated with a second processor, is executed.

In a multiprocessor computer system, when one processor attempts to locate desired data in its own cache, and fails to locate such data, it is necessary to attempt to locate the data in the cache of the other processor. If the data is not found in the cache of the other processor, it is necessary to retrieve the data from a main store. Occasionally, the data is found in the cache of the other processor. The one processor must utilize the desired data in the execution of an instruction.

For some instructions, the one processor may retrieve the data directly from the cache of the other processor, store the data in its own cache, and utilize the data in the execution of the instruction.

However, for other instructions, the one processor cannot retrieve the data directly from the cache of the other processor. It is therefore necessary to perform a flush operation. During the flush operation, the desired data is flushed from the cache of the other processor to the main store. The data is then utilized by the one processor in the execution of its instruction.

However, during the flush operation, the one processor may be attempting to execute a command. If the command may be classified as one of said other instructions, in view of the need to flush the desired data from the cache of the other processor to the main store prior to the execution of the command, it is necessary to mask the presence of the command, in the one processor, from the remainder of the multiprocessor system until the flush operation is complete. When the flush operation is complete, the mask, associated with the command, is released and the command is executed. However, if the command may not be classified as one of said other instructions, the presence of the command should not be masked from the remainder of the multiprocessor system and execution of the command should commence uninhibited.

SUMMARY OF THE INVENTION

It is a primary object of the present invention to provide an apparatus for masking the contents of a first storage means from a system until the contents of a second storage means used in a flush operation, and for releasing the mask associated with the first storage means when the contents of the second storage means used in a flush operation.

It is another object of the present invention to provide an apparatus for masking the contents of a first command status register in a multiprocessing system from said system thereby preventing the execution of the contents of said first command status register until the contents of a second command status in said multiprocessing system has been used in a flush operation and for releasing the mask associated with the first command status register when the contents of the second command status register has been used in a flush operation.

It is yet another object of the present invention to provide a method and apparatus for masking the contents of a first command storage register and for borrowing a second command storage register to flush data from the processor to memory.

These and other objects of the present invention are accomplished by providing a circuit in a system which senses the storage of information in one storage means and senses the storage of information in another storage means and which masks the information in the one storage means from the system in order to permit the system to access the information stored in the second storage means. Specifically, the system is a multiprocessor system, the one storage means being a first command status register for storing command information therein associated with a first processor of the multiprocessor system, the second storage means being a second command status register for storing command information therein associated with a second processor of the multiprocessor system. The circuit in the multiprocessor system is a stacked op discriminator circuit which senses the existence of command information stored in the first command status register and senses the existence of information (not necessarily command information) stored in the second command status register and masks the command information in the first command status register from the multiprocessor system in order to permit the information stored in the second command status register to be used in a flush operation by the mutliprocessor system. When the information stored in the second command status register has been used in a flush operation by the mutiprocessor system, the mask, associated with the first command status register, is released and the command information stored therein is executed by the multiprocessor system.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 12 illustrates the clock sequences associated with the instruction processing unit (IPU) circuits, IPU 0 and IPU 1, and the BSM control circuit shown in FIG. 2;

DETAILED DESCRIPTION OF THE PREFERRED EMBODIMENT

Figure 1:
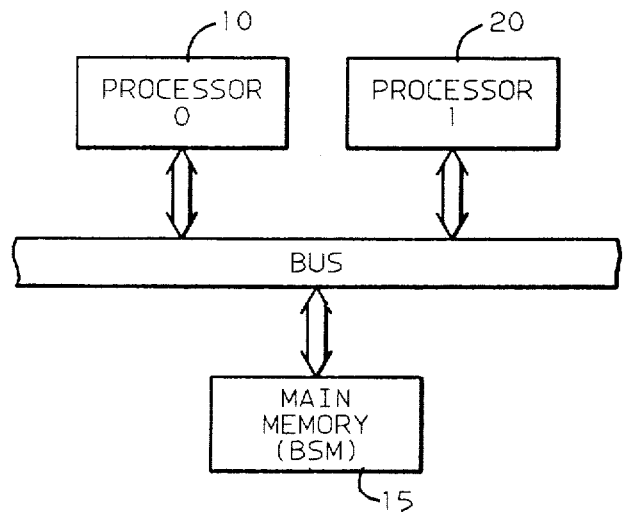
FIG. 1 illustrates a block diagram of a multiprocessor system in accordance with the present invention.

Referring to FIG. 1, a multiprocessor system is illustrated. In FIG. 1, a first processor 10, of the multiprocessor system, is connected to a main memory 15 by way of a system bus (the main memory being alternatively termed a Basic Storage Module BSM or a main store). A second processor 20, of the multiprocessor system, is also connected to the main store 15 by way of the system bus.

Figure 2:
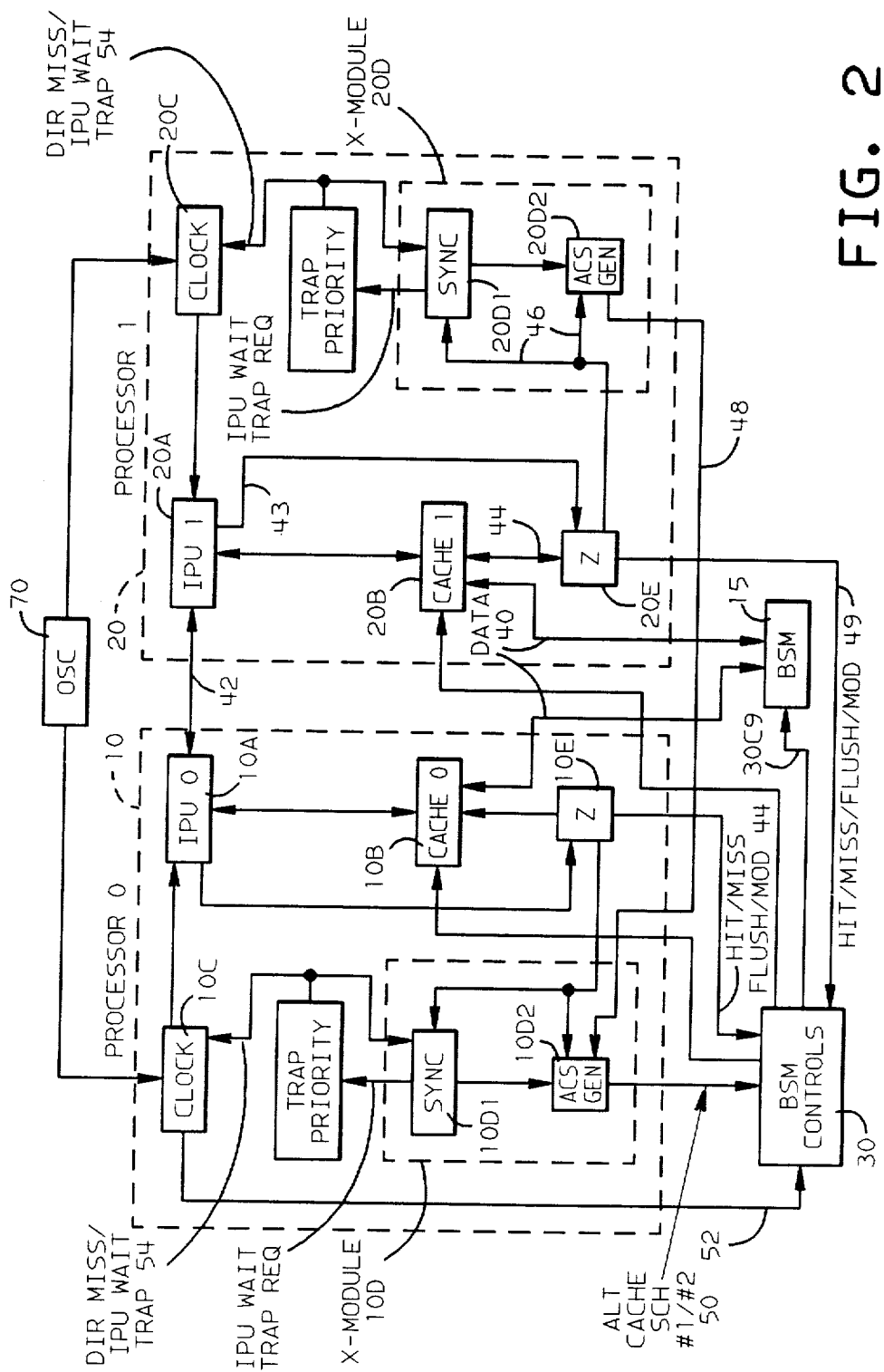
FIG. 2 illustrates a more detailed block diagram of the multiprocessor system of FIG. 1.

Referring to FIG. 2, a more detailed block diagram of the multiprocessor system of FIG. 1 is illustrated. In FIG. 2, the first processor 10, alternatively termed processor 0, includes an instruction processing unit 10a (IPU 0), a cache 10b (cache 0) connected to the IPU 10a, a clock generator 10c connected to the IPU 10a, and an X module 10d connected to the clock generator 10c. The X module 10d includes a novel sync circuit 10d1 connected to the clock generator 10c and an alternate cache search signal generation circuit (ACS GEN) 10d2 connected to the sync circuit 10d1. The first processor 10 further includes a trap priority circuit 10f connected between the sync circuit 10d1 of the X module 10d and the clock generator 10c, and a cache directory (Z) 10e connected to cache 10b, to the sync circuit 10d1, to the ACS GEN 10d2 of X module 10d, and to IPU 10a.

The second processor 20, alternatively termed processor 1, includes an instruction processing unit (IPU) 20a (IPU 1), a cache 20b (cache 1) connected to the IPU 20a, a clock generator 20c connected to the IPU 20a, and an X module 20d connected to the clock generator 20c. The X module 20d includes a novel sync circuit 20d1 connected to the clock generator 20c and an alternate cache search signal generation circuit (ACS GEN) 20d2 connected to the circuit 20d1. The second processor 20 further includes a trap priority circuit 20f connected between the sync circuit 20d1 of the X module 20d and the clock generator 20c, and a cache directory (Z) 20e connected to cache 20b, to the sync circuit 20d1 and the ACS GEN 20d2 of X module 20d, and to IPU 20a.

The multiprocessor system of FIG. 2 further includes a main store control circuit 30, otherwise termed a Basic Storage Module (BSM) control circuit 30 or "BSM Controls 30", connected to processor 10, and in particular, to the X module 10d, the cache 10b, and the cache directory 10e of processor 10, and to processor 20, and in particular, to the X module 20d, the cache 20b, and the cache directory 20e of processor 20. The BSM control 30 is further connected to a main store 15 or Basic Storage Module (BSM) 15. The BSM control 30 is responsible for controlling the functioning of the multiprocessor system of FIG. 2, the details of its functioning being described in the paragraphs below which are dedicated to a description of the functional operation of the present invention.

Figure 3:
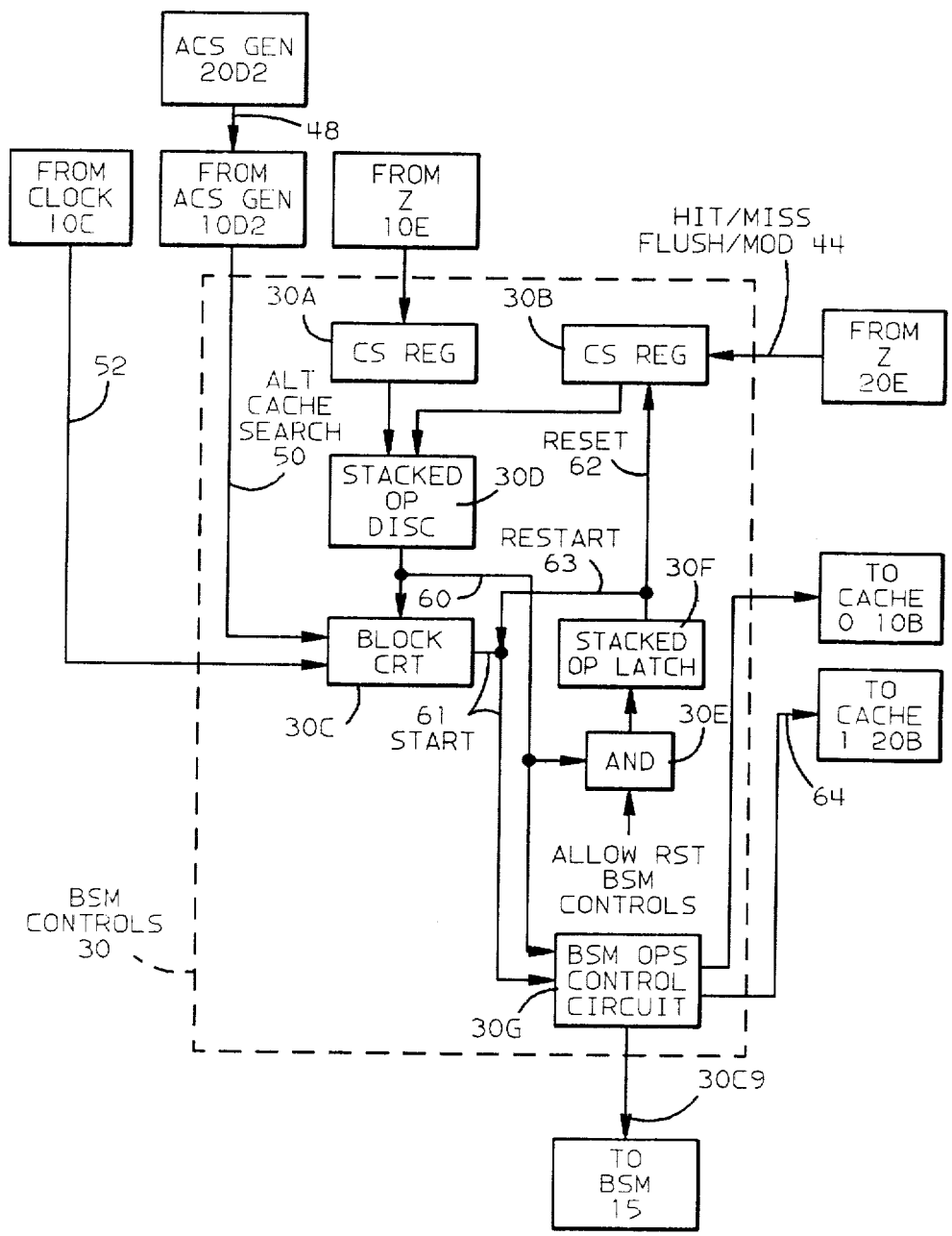
FIG. 3 illustrates a block diagram of a BSM control circuit, a portion of the multiprocessor system of FIG. 2.

Referring to FIG. 3, a block diagram of the BSM controls 30 of FIG. 2 is illustrated. In FIG. 3, the BSM controls 30 comprise a command status register (CS REG) 30a connected to the cache directory (Z) 10e and a command status register (CS REG) 30b connected to the cache directory (Z) 20e. The cache directories (Z) supply hit/miss/flush/modified information to the command status registers 30a and 30b. The command status registers 30a and 30b are each connected to a stacked op discriminator circuit 30d. The stacked op discriminator circuit 30d receives the contents of the command status registers 30a and 30b and develops an output signal when the command status registers 30a and 30b contain predetermined information. For example, when command status register 30a contains a WHEREVER word, and command status register 30b contains a flush indication from cache directory (Z) 20e, the stacked op discriminator circuit 30d develops an output signal. The stacked op discriminator circuit 30d would also generate an output signal if command status register 30b contained a WHEREVER word and command status register 30a contained a flush indication from cache directory (z) 10e. The output signal (60) from the stacked op discriminator circuit 30d performs a "masking" function in that it masks the contents of the command status register (CS REG) containing the WHEREVER word information from the remainder of the BSM controls 30 and prevents the normal start signal 61 from being sent to the BSM ops control circuit 30g. The output signal 60 of the stacked op discriminator circuit 30d also enables the contents of the command status register containing the flush indication to be seen by the BSM ops control circuit 30g. The stacked op discriminator circuit 30d is connected to a block circuit 30c and to an AND gate 30e. A signal termed "allow reset BSM controls" energizes the other input terminal of the AND gate 30e. The block circuit 30c is connected to clock 10c, to ACS GEN 10d2. The AND gate 30e is connected, at its output terminal, to an input (set) terminal of a stacked op latch 30f. The output terminal of the stacked op latch 30f is connected to 30 the CS REG 30b and to a BSM OPS CONTROL CIRCUIT 30g. The BSM ops control circuit 30g is connected, at its output, to cache 10b, cache 20b, and to BSM 15, the BSM ops control circuit 30g controlling the transfer of data from the cache memories 10b and 20b to the BSM 15 and vice-versa.

Figure 4:
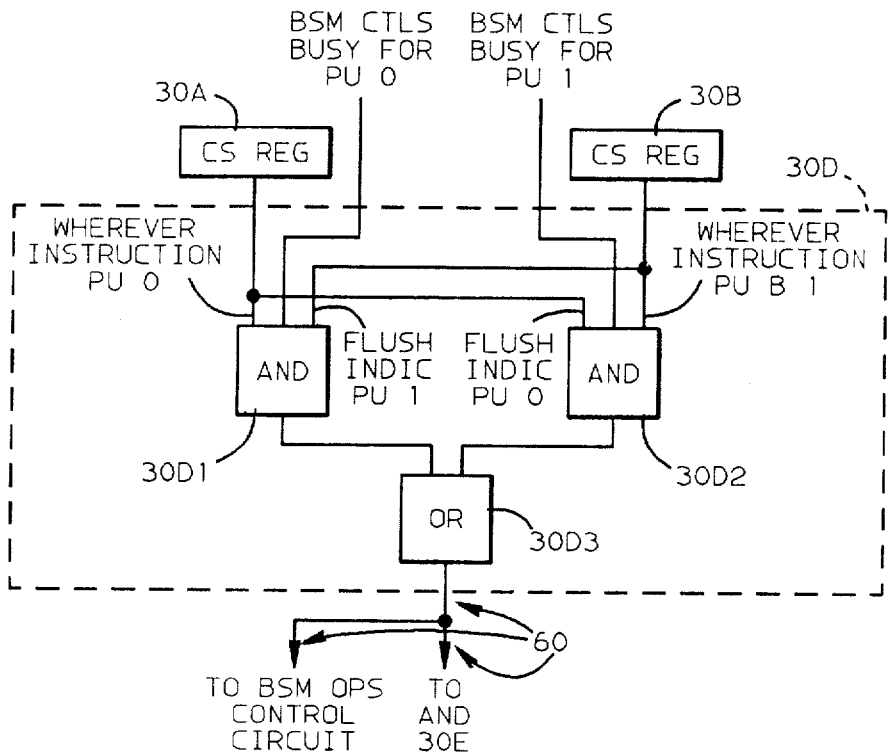
FIG. 4 illustrates a block diagram of the stacked op discriminator circuit of FIG. 3.

Referring to FIG. 4, a block diagram of the stacked op discriminator circuit 30d of FIG. 3 is illustrated. In FIG. 4, the stacked op discriminator circuit 30d comprises an AND gate 30d1 connected to CS REG 30a and an AND gate 30d2 connected to CS REG 30b.

AND gate 30d1 is connected to AND gate 30d2, and vice-versa. Further, AND gate 30d1 is connected to a "BSM CTLS BUSY FOR PU0" line, and AND gate 30d2 is connected to a "BSM CTLS BUSY FOR PU1" line. The outputs of AND gates 30d1 and 30d2 are connected to an OR gate 30d3. The output of OR gate 30d3 represents line 60 as shown in FIG. 3.

Figure 5:
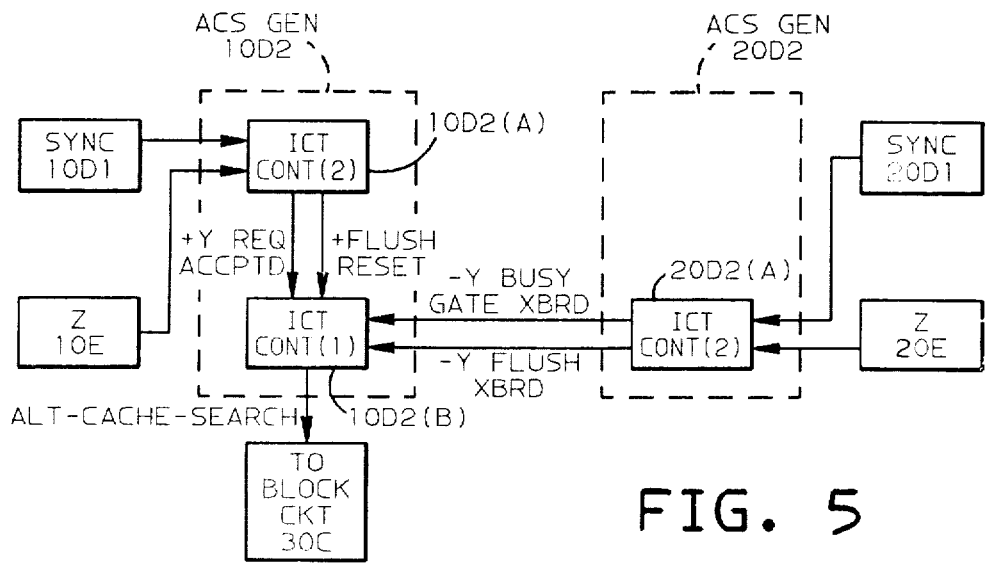
FIG. 5 illustrates a block diagram of a pair of alternate cache signal generation circuits, a portion of the multiprocessor system of FIG. 2.

Referring to FIG. 5, a block diagram of the alternate cache search signal generation circuits (ACS GEN) 10d2 and 20d2 of FIG. 2 is illustrated. In FIG. 5, the ACS GEN 20d2 comprises portions of an ICT Control (2) 20d2(a). The ICT Control (2) 20d2(a) receives signals from cache directory 20e and sync circuit 20d1 and generates output signals "−Y busy gate XBRD" and "−Y flush XBRD" in response thereto. The ACS GEN 10d2 comprises portions of an ICT Control (2) 10d2(a) connected to sync circuit 10d1 and cache directory (Z) 10e, the Control (2) 10d2(a) generating output signals "+Y REQ accepted" and "+flush reset" in response to output signals from the cache directory (Z) 10e and sync circuit 10d1. The ACS GEN 10d2 also comprises portions of an ICT Control(1) 10d2(b) connected to the ICT Control (2) 10d2(a) and receiving the output signals therefrom for developing the alternate cache search signals in response thereto, the alternate cache search signals being received by the block circuit 30c.

Figure 6:
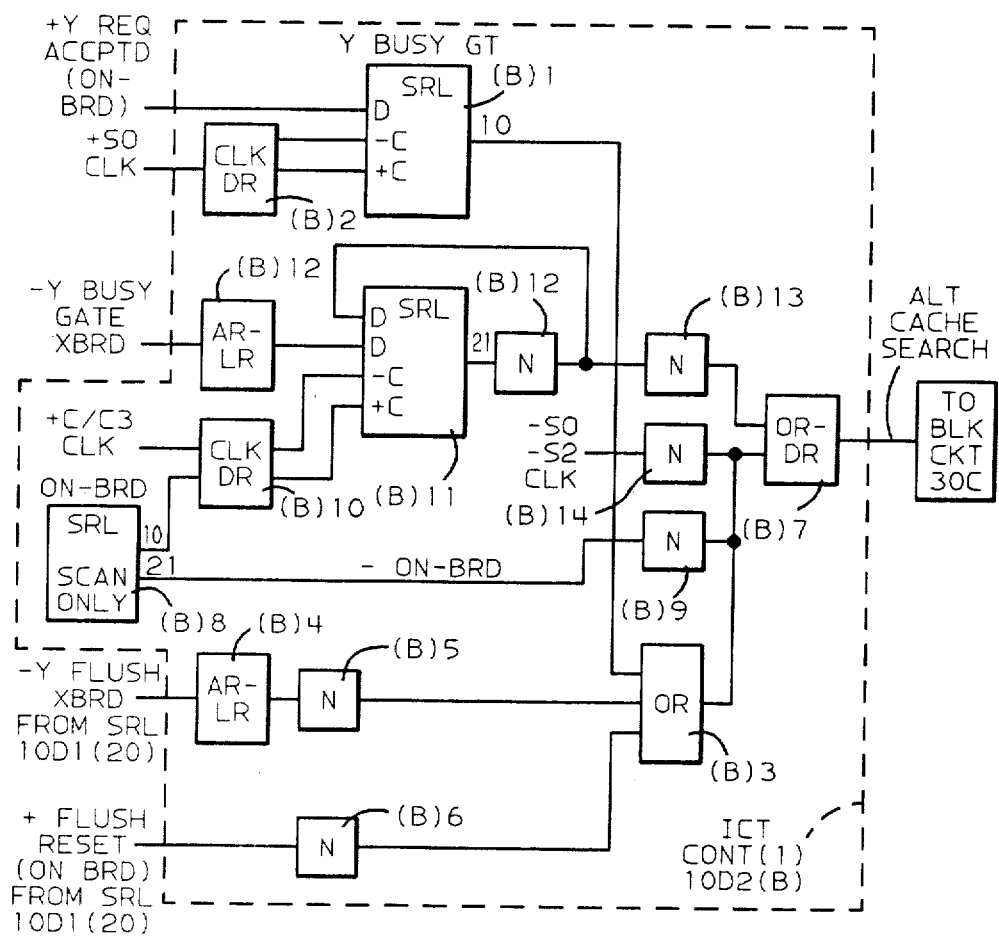
FIG. 6 illustrates a block diagram of the ICT Control(1), a portion of the alternate cache signal generation circuits of FIG. 5.

Referring to FIG. 6, a block diagram of portions of the ICT Control(1) 10d2(b) of FIG. 5 is illustrated. In FIG. 6, the ICT Control(1) 10d2(b) portion comprises an SRL latch circuit (b)1 which receives the "+Y request accepted" signal from the ICT Control (2) 10d2(a) and output signals from a clock driver circuit (b)2. The clock driver circuit (b)2 receives an +SO clock signal. The output of the SRL latch (b)1 is connected to an input terminal of an OR gate (b)3. The "−Y flush XBRD" signal energizes another input terminal of OR gate (b)3 via receiver circuit (b)4 and inverter (b)5. The "+flush reset" signal energizes another input terminal of OR gate (b)3 via inverter (b)6. The output of OR gate (b)3 is connected to a second input terminal of OR driver (b)7. The ICT Control(1) 10d2(b) portion also comprises an SRL 12 scan only latch (b)8 connected, at output terminal 21, to the OR driver circuit (b)7 via inverter (b)9. The latch (b)8 is connected, at output terminal 10, to a clock driver circuit (b)10. A +C1/C3 clock also energizes the clock driver (b)10. The clock driver circuit (b)10 is connected, at its output, to the −C and +C input terminals of an SRL latch circuit (b)11. The "−Y busy gate XBRD" signal energizes another input terminal of the SRL latch circuit (b)11 via a driver/receiver circuit (b)12. Output terminal 21 of of the SRL latch circuit (b)11 is connected to the first input terminal of OR driver (b)7 via inverters (b)12 and (b)13. A −SO/−S2 clock energizes the second input of OR driver (b)7 via inverter (b)14. The OR driver circuit (b)7 generates the alternate cache search signals which energize the block circuit 30c.

Figure 7:
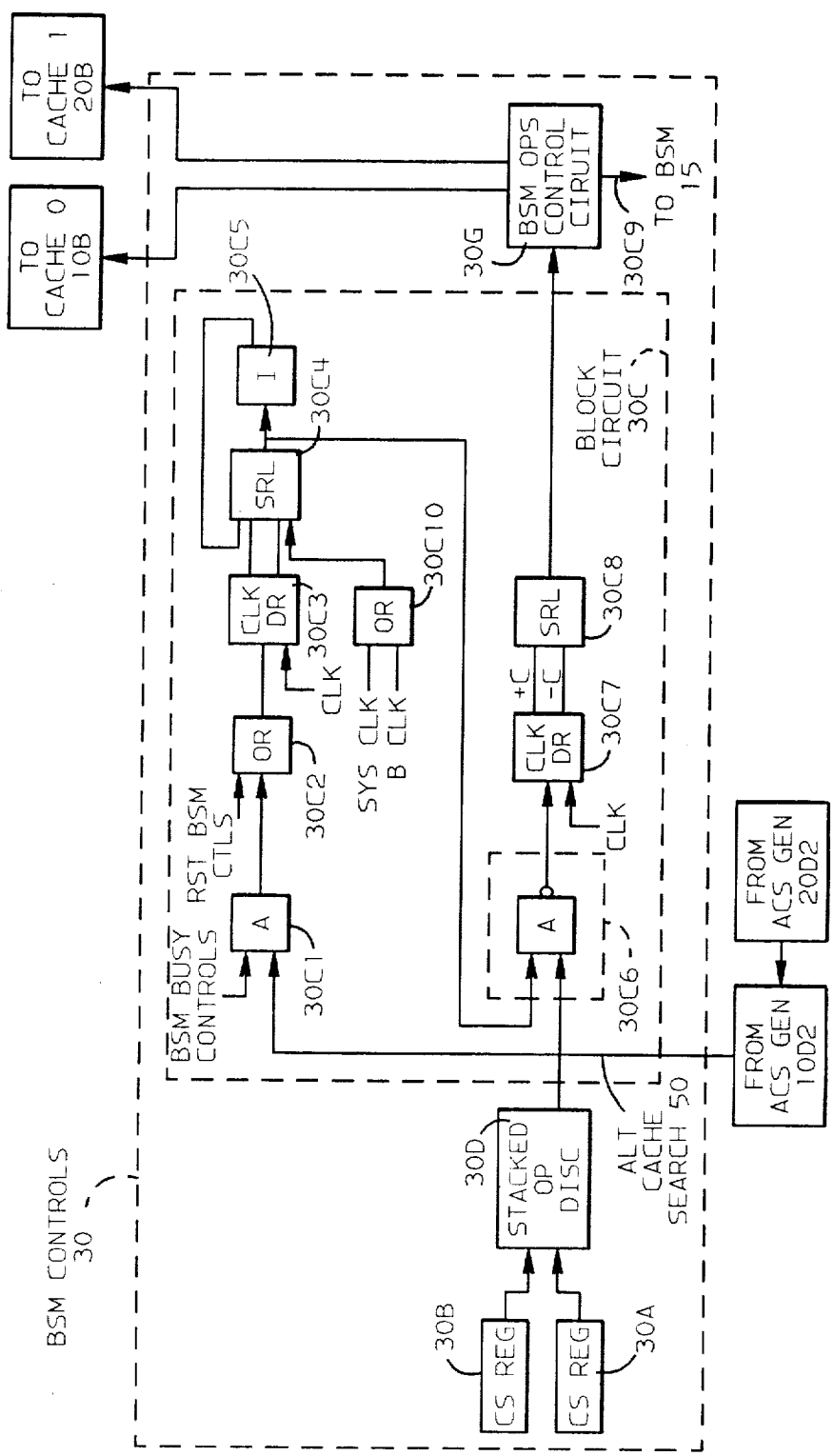
FIG. 7 illustrates a block diagram of a block circuit, a portion of the multiprocessor system of FIG. 2.

Referring to FIG. 7, a block diagram of the block circuit 30c disposed within the BSM controls 30, is illustrated. The block circuit 30c includes an AND gate 30c1 having one input terminal connected to a "BSM busy controls" line and another input terminal connected to the ACS GEN 10d2. The output of AND gate 30c1 is connected to OR gate 30c2, the other input of which is connected to a "Reset BSM controls" signal. The output of OR gate 30c2 is connected to the input of a clock driver 30c3, the output of clock driver 30c3 including a +C output terminal and a −C output terminal. The +C and −C output terminals are input to an SRL latch circuit 30c4 (L1). The L1 (master) portion of the SRL latch circuit 30c4 is connected internally to an L2 (slave) portion which is controlled by OR circuit 30c10. See FIG. 10b for a detailed construction of this SRL latch circuit. An output of the SRL latch circuit 30c4 (L2) is connected to an input of invert gate 30c5. The output of invert gate 30c5 is fed back to another input terminal of the SRL latch 12 circuit 30c4 (L1). An output terminal (L2) of SRL latch circuit 30c4 is connected to one input of NAND gate 30c6 (NAND gate 30c6 comprising an AND gate with an inverter connected to its output terminal). The other input of NAND gate 30c6 is connected to the command status registers 30a and 30b via stacked op discriminator circuit 30d (it should be noted, at this point, that the command status registers 30a and 30b shown in FIGS. 3, 4, and 7 receive hit/miss/modified data information from the cache directories 10e and 20e, data information, and information related to the initiation of execution of a special instruction called a "wherever", abbreviated W. E., instruction). The output of NAND gate 30c6 is connected to a clock driver circuit 30c7. The clock driver circuit 30c7 develops two outputs: a +C output and a −C output. The +C and the −C outputs of clock driver 30c7 are connected to input terminals of an SRL latch circuit 30c8. The output terminal of the SRL latch circuit 30c8 is connected to the BSM ops control circuit 30g. The BSM ops control circuit 30g functions to initiate the flush of data from a processor's cache 10b or 20b to the BSM 15 and then execute the subsequent WHEREVER word which has been masked during the flush operation.

Figure 8:
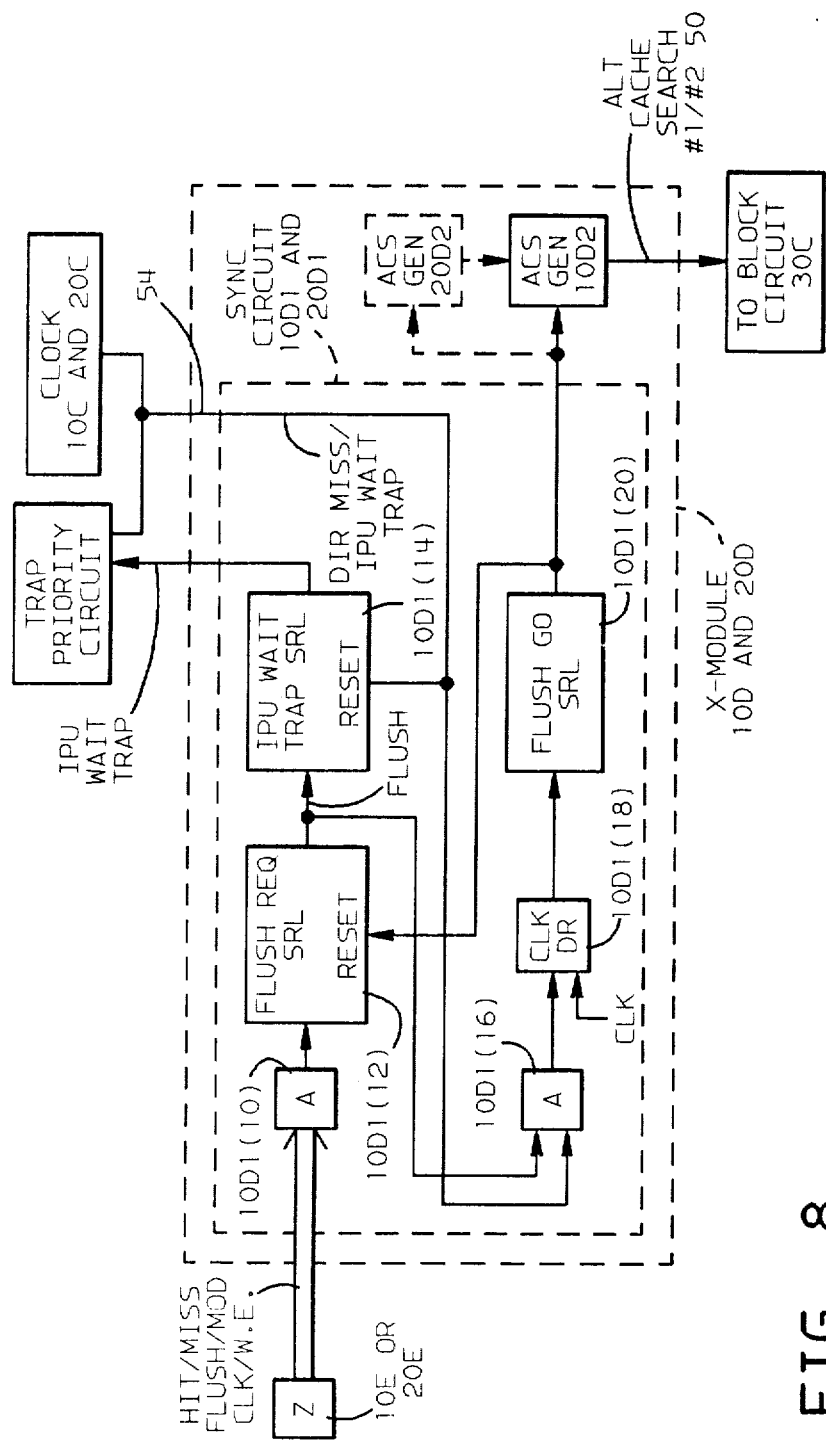
FIG. 8 illustrates a block diagram of a sync circuit, a portion of the multiprocessor system of FIG. 2.

Referring to FIG. 8, a block diagram of sync circuits 10d1 and 20d1 is illustrated. In FIG. 8, sync circuits 10d1 and 20d1 each comprise an AND gate 10d1(10) connected to cache directories 10e and 20e for receiving hit/modified data information from cache directories 10e and 20e, for receiving a clock signal, and for receiving the special "wherever" instruction indicating that the "wherever" instruction is about to be executed. The output of AND gate 10d1(10) is connected to an input of a FLUSH REQ SRL latch circuit 10d1(12). This latch 11 circuit is the same latch circuit, in construction, 12 as the latch circuits 30c4 and 30c8. The SRL latch circuit 10d1(12) is connected to an IPU WAIT TRAP SRL latch circuit 10d1(14). Latch circuit 10d1(14) develops an IPU WAIT TRAP REQUEST signal which energizes clock generators 10c and 20c. When the clock signal energizing the IPU's 10a and 20a are in sync with the clock signal energizing the block circuit 30c of the BSM controls 30, the clock generators 10c and 20c generate a DIR MISS/IPU WAIT TRAP signal which resets latch circuit 10d1(14) and which energizes one input terminal of AND gate 10d1(16). The other input of AND gate 10d1(16) originates from the output terminal of latch circuit 10d1(12). The output of AND gate 10d1(16) is connected to an input of clock driver circuit 10d1(18). A clock signal energizes the clock driver circuit. The output of clock driver circuit 10d1(18) is connected to an input of a FLUSH GO SRL latch circuit 10d1(20). The output of the FLUSH GO latch circuit 10d1(20) is connected to a reset terminal of the FLUSH REQ latch circuit 10d1(12), and to either the ACS GEN 10d2 or to the ACS GEN 10d2 via the ACS GEN 20d2 (depending upon the sync circuit). The ACS GEN 10d2 develops the alternate cache search signal which energizes the block circuit.

Figure 9:
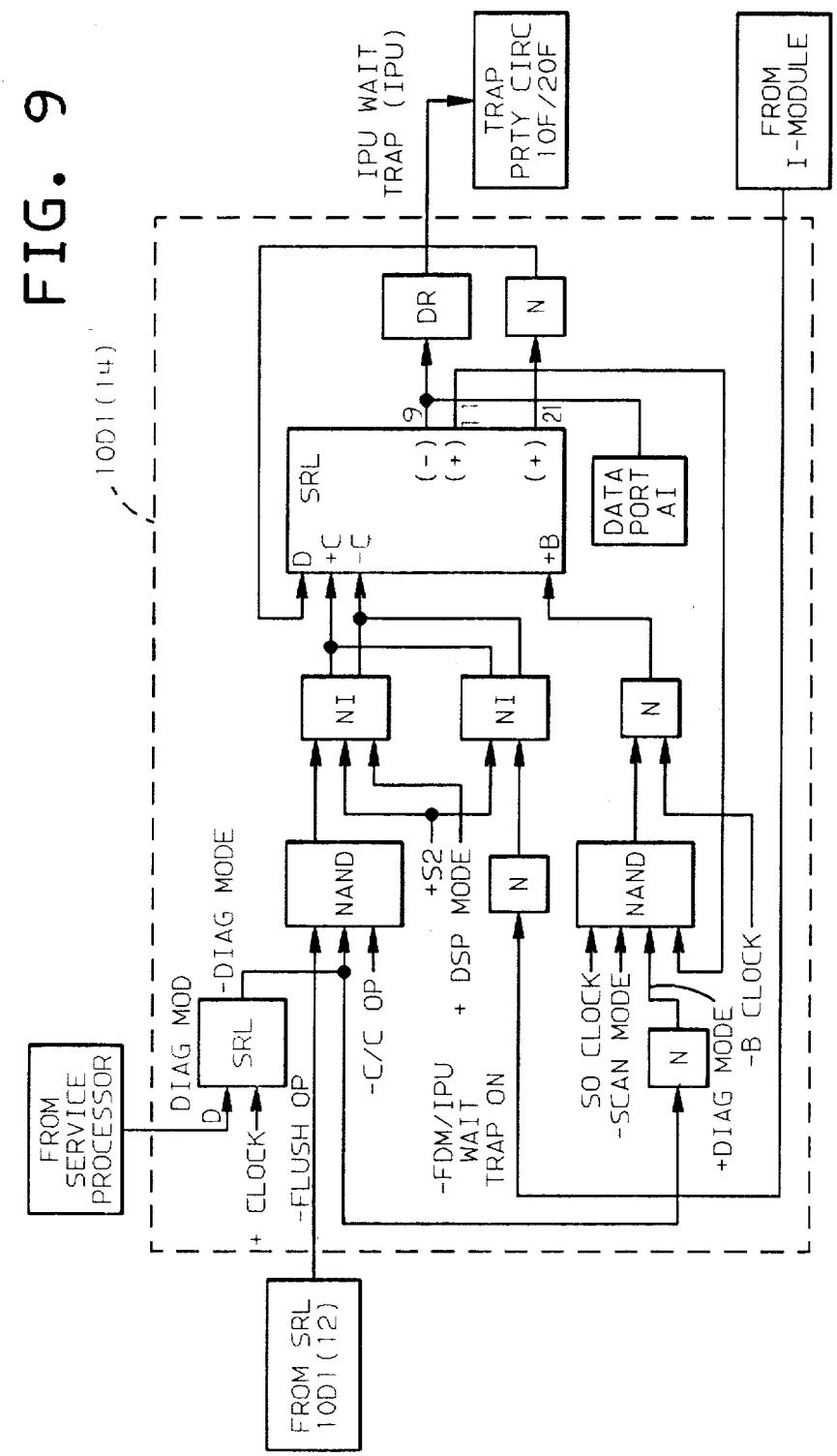
FIG. 9 illustrates a block diagram of the IPU WAIT TRAP SRL, a portion of the sync circuit of FIG. 8.

Referring to FIG. 9, a detailed construction of the IPU WAIT TRAP SRL 10d1(14) shown in FIG. 8 is illustrated. The IPU wait trap SRL 10d1(14) is discussed in detail in a co-pending application entitled "Dual Stream Processor Apparatus", Ser. No. 548,748, filed Nov. 4, 1983, the disclosure of which is incorporated by reference into the specification of this application. A complete discussion of the construction and functional operation of the IPU wait trap SRL 10d1(14) may be found in the above-referenced co-pending application associated with FIG. 3 of the drawings.

Figure 10A:
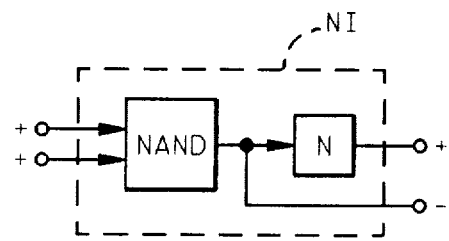
FIGS. 10a and 10b illustrate block diagrams of the nand-invert (NI) circuits of FIG. 9 and the SRL latch circuits (SRL) of FIGS. 6, 7, 8, and 9, respectively.

Referring to FIG. 10a, a diagram of the construction of the nand-invert circuit (NI) shown in FIG. 9 is illustrated.

Figure 10B:
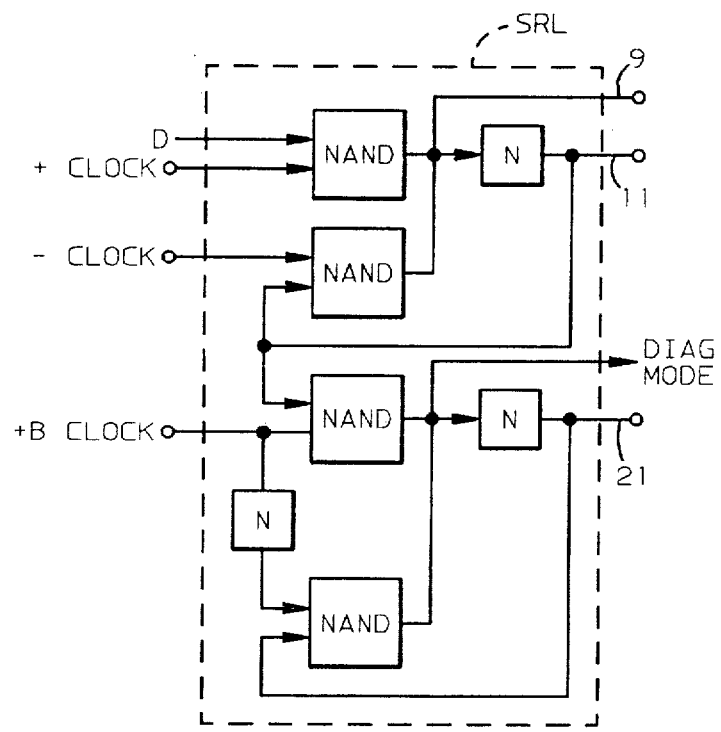

Referring to FIG. 10b, a diagram of the construction of the SRL latch circuit shown in FIG. 9 is illustrated. In addition, FIG. 10b illustrates the construction of the SRL latch circuits shown in FIGS. 6, 7 (latches 30c4 and 30c8), and 8 (the FLUSH REQ latch 10d1(12) and the FLUSH GO latch 10d1(20)).

Figure 11:
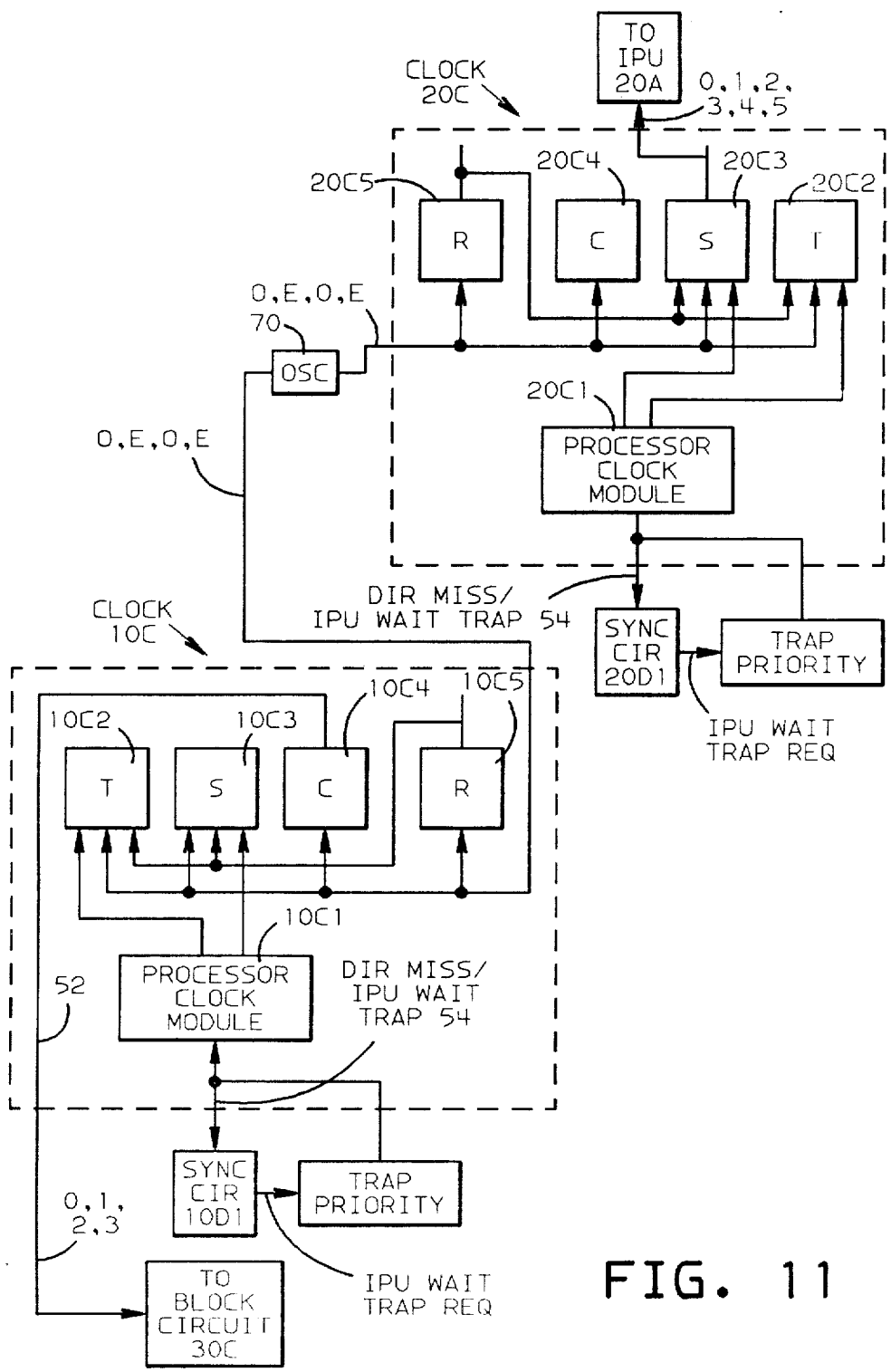
FIG. 11 illustrates a block diagram of the clock circuits of FIG. 2.

Referring to FIG. 11, a block diagram of the clock generator 10c and 20c, shown in FIG. 2, is illustrated. In FIG. 11, clock generator 10c includes a processor clock module 10c1 connected to the sync circuit 10d1. A T clock 10c2 is connected to the processor clock module 10c1. An S clock 10c3 is connected to the processor clock module 10c1. A C clock 10c4 is connected to an oscillator 70, the oscillator 70 also being connected to the S clock 10c3 and the T clock 10c2. The C clock is connected, at its output, to the block circuit 30c via line 52. Clock generator 20c also includes a processor clock module 20c1 connected to the sync circuit 20d1. The module 20c1 is further connected to a T clock 20c2, and to an S clock 20c3, the T clock and the S clocks being connected to oscillator 70. The oscillator 70 is further connected to a C clock 20c4 and an R clock 20c5. An output of the R clock 20c5 is connected to an input of the S clock 20c3. An output of the S clock 20c3 is connected to IPU 20a. The trap priority circuits 10F and 20F each receive the IPU WAIT TRAP REQUEST signals from the sync circuits 10d1 and 20d1, respectively, and, when appropriate, issue the DIR MISS-/IPU WAIT TRAP signal to the processor clock modules 10c1 and 20c1 causing them to undertake a clock synchronization action.

Referring to FIG. 12, clock sequences associated with the clocks for IPU 10a, IPU 20a, and the BSM controls 30 are illustrated. Note that, at various points along the sequence, the clock associated with the BSM controls 30 is out-of-sync with respect to the clock associated with IPU 20a and with respect to the clock associated with IPU 10a. For example, at one point along the sequence, the clock associated with the BSM controls 30 generates the following pulse sequence: 0, 1, 2, 3, 0; the clock associated with the IPU 10a generates the following pulse sequence: 0, 1, 2, 3, 0; however, the clock associated with the IPU 20a generates the following pulse sequence: 0, 1, 2, 3, 4, 5, 0. When pulse 4 of IPU 20a is generated, the clock associated with the BSM controls 30 is out-of-sync with the clock associated with the IPU 20a. As will be demonstrated in the functional description presented in the following paragraphs, the clock associated with the IPU 20a must be synchronized with the clock associated with the block circuit 30c of the BSM controls 30 prior to flushing a desired page of data from the IPU 20a to the BSM 15.

Figure 13A:
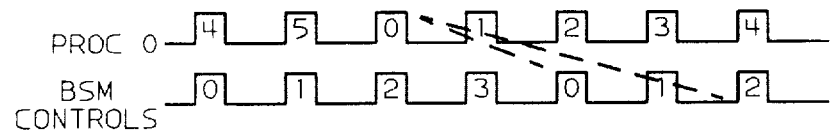
FIG. 13a illustrates an out-of-sync situation wherein a processor's clocks are out-of-sync with a main store (BSM) control clock.

Referring to FIG. 13a, an out-of-sync situation is illustrated wherein the clock associated with one processor (e.g.-processor 10) is out-of-sync with the clock associated with the BSM controls 30. Note that pulse zero associated with the Proc 0 clock is out of sync with pulse zero associated with the BSM controls clock.

Figure 13B:
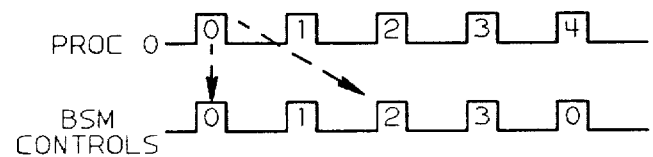
FIG. 13b illustrates an in-sync situation wherein a processor's clocks are in-sync with a main store (BSM) control clock.

Referring to FIG. 13b, an in-sync situation is illustrated wherein the clock associated with the one processor is in-sync with the clock associated with the BSM controls 30. Pulse zero associated with the Proc 0 clock is in sync with the pulse zero associated with the BSM controls clock. The FIG. 13b situation represents an in-sync condition because, when pulse 0 of the processor 10 clock energizes IPU 10a, releasing data from cache 10b for storage in BSM 15, pulse 2 of the BSM controls 30 clock will energize the BSM 15 at the precise point in time (two pulse periods from initiation of pulse 0) in order to accept the released data.

The functional operation of the present invention will be described in the following paragraphs with reference to FIGS. 1 through 13b of the drawings.

Referring to FIG. 1, a multiprocessor system is illustrated. In FIG. 1, when processor 10 searches for data in its cache and fails to locate the data, it searches for the data in the cache of processor 20. If it locates the data in the cache of processor 20, the data is either directly transferred to the cache of processor 10 or it is transferred to BSM 15 for use by processor 10, depending upon the type of instruction being executed by processor 10. If the type of instruction being executed by processor 10 requires that the data in the cache of processor 20 be transferred to the BSM 15, prior to the transfer (or flush), the clocks of the processor 20 must be synchronized with the clocks energizing the BSM 15. When the clocks of processor 20 are synchronized with the clocks energizing the BSM 15, the data is flushed from processor 20 to the BSM 15. Processor 10 may then utilize the data in the execution of its instruction. In the above sequence of functional events, the transfer or flush of the data from processor 20 to BSM 15 is blocked temporarily until the clocks of processor 20 are synchronized with the clocks energizing the BSM 15. When the above referenced clocks are synchronized, the blocking function is terminated. When the blocking function is terminated, the transfer of the data from processor 20 to BSM 15 begins.

However, if a further instruction is being executed by processor 10 which does not require a flush of the data from processor 20 to BSM 15, rather, it requires a direct transfer of the data from the cache of processor 20 to the cache of processor 10, the above referenced blocking function is precluded or prevented from occurring; the data is directly transferred from the cache of processor 20 to the cache of processor 10 and execution of the further instruction begins.

In the multiprocessor system of FIG. 1, when the original instruction is being executed by processor 10, requiring a flush operation, the blocking function occurs thereby blocking the flush operation until the clock synchronization operation is complete. When the synchronization is complete, the flush operation begins. When the flush operation is complete, the "mask" is removed and the original instruction is executed. However, when the further instruction is being executed by processor 10, not requiring the flush operation, there is no need for a synchronization operation. Therefore, there is no need for a blocking function, since the flush operation is normally blocked in order to permit the clock synchronization to be completed. As a result, when the execution of the further instruction is sensed, the blocking function is precluded from occurring.

Referring to FIG. 2, a more detailed construction of the multiprocessor system of FIG. 1 is illustrated. In FIG. 2, when IPU 20a executes an instruction, it may need data stored in BSM 15. Consequently, the data is retrieved from BSM 15 and stored in cache 20b via line 40 marked "data". The data is stored in cache 20b because the length of time required to subsequently withdraw data from cache 20b is much smaller than the length of time required to subsequently withdraw data from BSM 15. When the instruction is executed, the data may be modified. The modified data is re-stored in cache 20b. The original, un-modified data still resides in the BSM 15.

Assume that processor 10 must execute an instruction which requires the utilization of the modified data stored in cache 20b of processor 20. Further assume that the instruction to be executed by processor 10 is a special type of instruction wherein data must be retrieved from the main store (BSM) 15 and cannot be retrieved directly from the other processor (processor 20). This special type of instruction may, for example, be a so-called "wherever" type of instruction.

Prior to execution of the instruction, the cache directory 10e of processor 10 evaluates cache 10b to determine if the modified data is stored therein. When it determines that the modified data is not stored in cache 10b, processor 10 instructs cache directory 20e of processor 20, via lines 42 and 43, to search the cache 20b of processor 20 for the modified data. The cache directory 20e searches cache 20b for the modified data, via line 44.

Simultaneously with the search of cache 20b for the modified data, cache directory 20e energizes the ACS GEN circuit 20d2, via line 46. When the cache directory 20e determines that the modified data is stored in cache 20b, the sync circuit 20d1 begins a synchronization operation, to be discussed below. However, with respect to the ACS GEN circuit 20d2, referring to FIG. 5, the ICT Control (2) 20d2(a) of the ACS GEN 20d2 generates the "−Y busy gate XBRD" signal indicating that a search of the cache 20b is currently being implemented in an effort to locate the modified data. The "−busy gate XBRD" signal energizes the ICT Control(1) 10d2(b) of the ACS GEN 10d2 via line 48 in FIG. 2.

When the cache directory 20e determines that the modified data is stored in cache 20b, the cache directory 20e of processor 20 transmits hit/modified information to the command status register 30b via line 49 storing a "flush" indication therein. The hit/modified "flush" indication, stored within the command status register 30b, indicates that the desired, modified data is stored in cache 20b and that a flush of the data to the BSM is needed. Command status register 30b, normally associated with processor 20, is being borrowed by processor 10 for use during the execution of its instruction.

Referring to FIG. 6, the "−Y busy gate XBRD" signal is received by the receiver circuit (b)12 of the ICT Control(1) 10d2(b) disposed within the ACS GEN 10d2. As a result, the SRL latch (b)11 is set and an output is generated in response to this signal and in response to outputs from clock driver (b)10 (clock driver generates a signal in response to clocks C1/C3 and the on-board output signal from SRL scan only latch (b)8. The output signal from SRL latch (b)11 eventually energizes the first input terminal of OR driver (b)7 via a pair of inverters (b)12 and (b)13. The OR driver (b)7 of the ICT Control(1) 10d2(b) of ACS GEN 10d2 generates an ALT CACHE SEARCH#1 signal, this signal energizing the block circuit 30c of the BSM controls 30 via line 50.

At this point, the desired, modified data, stored in cache 20b, should be "flushed" from cache 20b of processor 20 to the main store (BSM) 15. However, since the instruction being executed by processor 10 is a type which requires that the modified data in cache 20b be flushed to the BSM, and since the modified data was located in cache 20b, prior to the flushing of the desired, modified data from cache 20b to BSM 15, the clocks of processor 20 must be synchronized with the clocks of the BSM controls 30. Therefore, the "flush" operation must be delayed until the clocks of the processor 20 are synchronized with the clocks of the BSM controls 30. The following discussion will describe the pre-flush synchronization operation wherein, in view of the type of instruction being executed by processor 10 and in view the flush indication stored in CS REG 30b, the flush operation is temporarily blocked (that is, prevented) from occurring while the clocks of processor 20 are synchronized with the clocks of the BSM controls 30.

When the hit/modified information from the cache directory 20e energizes the command status register 30b, a "flush" indication is stored in CS REG 30b. In addition, IPU 10a is executing a special instruction which requires that modified data, located in the other processor's cache (cache 20b), be flushed to the BSM 15 prior to accessing the data in the BSM 15, rather than directly transferring the modified data from cache to cache. One example of this special instruction is a "wherever" type of instruction. Assuming that the instruction being executed by processor 10 is a "wherever" type of instruction, a special instruction type indication "wherever" is stored in CS REG 30a. In this instance, since the special instruction type indication "wherever" is stored in CS REG 30a and the "flush" indication is stored in CS REG 30b, the stacked op discriminator circuit 30d develops an output signal therefrom which energizes the block circuit 30c. Furthermore, the ALT CACHE SEARCH#1 signal from the ACS GEN 10d2 via line 50 also energizes the block circuit 30c.

It should be noted that the output signal from the stacked op discriminator circuit 30d was developed in response to the special instruction type indication "wherever" stored in CS REG 30a and the "flush" indication stored in CS REG 30b. If any other combination of said indications was stored in CS REGs 30a and 30b, an output signal from the stacked op discriminator circuit 30d would not have been developed. This output signal is ultimately responsible for blocking the flush operation until the clock synchronization operation is complete. When the clock synchronization operation is complete, the flush operation begins. When the flush operation is complete, the execution of the special instruction "wherever" begins. The absence of said output signal would prevent the blocking function from occurring and would allow execution of the special instruction "wherever" to begin. Therefore, the stacked op discriminator circuit 30d senses the presence of the special type of instruction indication "wherever" stored in CS REG 30a and the presence of the flush indication in CS REG 30b and "masks" the "wherever" command or indication from the multiprocessing system of FIG. 2. When the mask is established, the blocking function is permitted to occur. When the blocking function is established, the clock synchronization operation is completed. When the clock synchronization operation is completed, the blocking function is terminated. When the blocking function is terminated, the flush operation commences. When the flush operation is completed, the "mask" is removed and the execution of the "wherever" special instruction is permitted to begin.

Referring to FIG. 4, a description of the functional operation of the stacked op discriminator 30d of FIG. 3 will be set forth. In FIG. 4, a WHEREVER instruction indication, stored in CS REG 30a, energizes one input of AND gate 30d1. A FLUSH indication, stored in CS REG 30b, energizes another input of AND gate 30d1. Since a third input of AND gate 30d1 is active with the BSM CTLS BUSY FOR PU0 signal, AND gate 30d1 develops an output signal which energizes one input terminal of OR gate 30d3. Therefore, the OR gate 30d3 develops an output signal, representing the output signal of the stacked op discriminator circuit 30d. Note that, in this case, the stacked op discriminator 30d sensed the existence of a WHEREVER instruction indication in CS REG 30a and a FLUSH indication in CS REG 30b, and developed an output signal in response thereto. If the WHEREVER instruction indication were stored in CS REG 30b, one input of AND gate 30d2 would be energized. If the FLUSH indication were stored in CS REG 30a, another input of AND gate 30d2 would be energized. A third input of AND gate 30d2 would be energized via the BSM CTLS BUSY FOR PU1 signal. As a result, AND gate 30d2 would develop an output signal, and therefore, OR gate 30d3 would also develop an output signal. With this output signal, the stacked op discriminator circuit 30d will have sensed the existence of the WHEREVER instruction in CS REG 30b and the existence of the FLUSH indication in CS REG 30a.

Referring to FIG. 7, a functional description of the operation of the block circuit 30c will be set forth. In FIG. 7, the ALT CACHE SEARCH #1 signal from ACS GEN 10d2 energizes the AND gate 30c1 while the "BSM busy controls" signal also energizes the AND gate 30c1. The output signal from the AND gate 30c1 passes through OR gate 30c2 and energizes the clock driver 30c3. In response to the clock signal "CLK", the clock driver 30c3 develops a +C and a −C output signal which energizes the +C and the −C input terminals of the SRL latch circuit 30c4. The L1 portion of the SRL latch circuit 30c4 is connected internally to an L2 slave portion which is controlled by OR circuit 30c10. See FIG. 10b for a detailed construction of this SRL latch circuit.

The SRL latch circuit 30c4 develops an output signal which energizes invert gate 30c5. As a result, invert gate 30c5 develops an output signal which is fed back to an input terminal of the SRL latch circuit 30c4. An output terminal (L2) of SRL latch circuit 30c4 is connected to one input of AND-invert or NAND gate 30c6. The output signal from the stacked op discriminator circuit 30d energizes the other input of NAND gate 30c6. In response, the output of NAND gate 30c6 goes to a "block" state thereby preventing clock driver 30c7 from developing a +C and −C to energize the SRL latch circuit 30c8. A detailed construction of the latch circuit 30c8 may be found in FIG. 10b of the drawings. This prevents the latch circuit 30c8 from developing an output signal to energize the BSM ops control circuit 30g. Since the BSM ops control circuit 30g does not become energized, the pending "flush" operation will not start at this time.

Referring to FIG. 2, it was stated in the above paragraphs that the cache directory 20e energizes the sync circuit 20d1 via line 46 simultaneously with the initiation of its search of cache 20b for the modified data. Referring to FIG. 8, a description of the functional operation of the sync circuit 20d1 will be provided.

In FIG. 8, when the sync circuit 20d1 receives the signal from the cache directory 20e via line 46, AND gate 10d1(10) generates an output signal which energizes a FLUSH REQ SRL latch circuit 10d1(12). The latch circuit is set and an output signal is generated in response thereto. A detailed construction of the latch circuit 10d1(12) is illustrated in FIG. 10b of the drawings. The output signal from the FLUSH REQ latch circuit energizes the "—flush op" input terminal of the IPU WAIT TRAP SRL latch circuit 10d1(14). A detailed construction of this latch circuit is illustrated in FIG. 9 of the drawings and a complete discussion of the functional operation of this latch circuit may be found in the co-pending application entitled "Dual Stream Processor Apparatus", the disclosure of which has been incorporated by reference into the specification of this application. The SRL 10d1(14) develops the "IPU WAIT TRAP REQUEST" output signal which energizes the trap priority circuit 20f. This trap priority circuit determines when a requested trap can be issued and at that time causes the trap to be taken. In this case, when the IPU wait trap is received by the trap priority circuit 20f, the DIR MISS/IPU WAIT TRAP signal is generated therefrom which energizes the clock generator 20c.

Referring to FIG. 11, a functional description of the clock generator 10c and 20c will be provided. In FIG. 11, R (10c5 and 20c5), C (10c4 and 20c4), S (10c3 and 20c3) and T (10c2 and 20c2) are clock pulse generation circuits that convert the raw oscillator outputs (O,E,O,E, etc) to various numbered clock pulse sequences (e.g.: R=0,1,2,3,0,1,2,3,etc). In FIG. 11, when the processor clock module 20c1 receives the DIR MISS/IPU WAIT TRAP signal from the trap priority circuit 20f, it resets a "run latch" within the S (20c3) and T (20c2) clock pulse generation circuits via line C3(a). This permits these clock pulse generation circuits to cease generating clock pulses when they reach the last numbered clock pulse in the sequence currently in progress. For example, 0,1,2,3,4,5 is the S and T clock sequence for the trap microword instruction. When clock pulse 5 is reached, the S (20c3) and T (20c2) clock pulse generation circuits will stop generating clock pulses. The R (20c5) and C (20c4) clock pulse generation circuits are not controlled by line C3(a) and thus they are free to keep running and producing their 0,1,2,3,0,1,2,3 etc clock pulse sequences. The clock pulse sequences of said R (20c5) and C (20c4) clock pulse generation circuits are always in sync and, furthermore, are always in sync with the R (10c5) and C (10c4) clock pulse generation circuits in clock 10c of processor 0. When pulse 3 is generated from the output of the R (20c5) clock pulse generation circuit, it energizes the S (20c3) clock pulse generation circuit such that its run latch is restored or set to a run state. This allows the S (20c3) clock pulse generation circuit to begin generating clock pulse sequences at the next 0 pulse time which will now be coincident with the 0 pulse time being generated by both the R (20c5) and C (20c4) clock pulse generation circuits. In addition, line C3(a) energizes the S (20c3)

clock pulse generation circuit such that it will continue to produce 0,1,2,3,0,1,2,3 etc clock pulse sequences once it has started. Thus, the output of the S(20c3) clock pulse generation circuit is synchronized with the output of the R(20c5) clock pulse generation circuit. Given that the outputs of the R (10c5/20c5) and C (10c4/20c4) clock pulse generation circuits are always synchronized, the output of the S(20c3) clock pulse generation circuit is now synchronized with the output of the C (10c4) clock pulse generation circuit which energizes the block circuit 30c.

Referring to FIG. 8, when the trap priority circuit 20f receives the IPU wait trap, it generates the DIR MISS-/IPU WAIT TRAP signal (54) which causes the clock generator 20c energizing IPU 20, to synchronize its clock with the clock energizing the block circuit via line 52. In FIG. 8, the DIR MISS/IPU WAIT TRAP signal is also received by AND gate 10d1(16) along with an output signal from the FLUSH REQ SRL 10d1(12). AND gate 10d1(16) develops an output signal, energizing clock driver 10d1(18). When energized by the clock signal CLK, the clock driver 10d1(18) develops an output signal which sets the FLUSH GO SRL latch circuit 10d1(20). An output from the the FLUSH GO SRL 10d1(20) energizes the ACS GEN 20d2. The ACS GEN 20d2 energizes the ACS GEN 10d2 and the ACS GEN 10d2 develops the ALT CACHE SEARCH#2 output signal which energizes the block circuit 30c via line 48. The manner in which the ACS GEN 20d2 develops its output signal energizing the ACS GEN 10d2 and the manner in which the ACS GEN 10d2 develops the ALT CACHE SEARCH#2 signal will be discussed in the following paragraph with reference to FIGS. 5 and 6 of the drawings.

In FIG. 5, the ICT Control (2) 20d2(a) within the ACS GEN 20d2 develops the "−Y flush XBRD" signal in response to the output signal from the FLUSH GO SRL 10d1(20), the "−Y flush XBRD" signal being received by the ICT Control(1) 10d2(b) disposed within the ACS GEN 10d2. In FIG. 6, the receiver (b)4 receives the "−Y flush XBRD" signal and generates its output signal which ultimately energizes the OR gate (b)3 via inverter (b)5. The OR gate (b)3 generates its output in response thereto which energizes the OR driver (b)7. As a result, the OR driver develops the ALT CACHE SEARCH#2 signal.

Referring to FIG. 7, the ALT CACHE SEARCH#2 signal is generated from the ACS GEN 10d2 and is received by the AND gate 30c1 of the block circuit 30c. The other input terminal "BSM busy controls" is still active. The AND gate 30c1 develops an output signal which energizes the clock driver 30c3 via OR gate 30c2. When the clock signal "CLK" is received by the clock driver 30c3, a +C and a −C output signal is generated therefrom. The SRL latch circuit 30c4 receives the +C and the −C output signals, is reset, and develops a new output signal therefrom, which is opposite to its previous output signal state. The new output signal energizes NAND gate 30c6, changing its output signal state to a new state. The new 21 state of the output signal from NAND gate 30c6 energizes clock driver 30c7. In response to the clock signal "CLK", clock driver 30c7 develops its changed output signal (+C and −C) energizing SRL latch circuit 30c8. The latch circuit 30c8 develops its changed output signal which energizes the BSM ops control circuit 30g.

Referring to FIG. 3, lines 30c9 and 64 from the BSM ops control circuit are energized thereby enabling BSM 15 and cache 20b. The clock signal energizing the block circuit 30c from clock generator 20c is in-sync with the clock signal energizing IPU 20a from clock generator 20c. Therefore, the clock of processor 20 is in-sync with the clock of the BSM controls 30. The "flush" operation may now begin. When the clocks of IPU 20a are synchronized with the clocks of the block circuit 30c within the BSM controls 30, the desired, modified data is flushed or moved from cache 20b to the BSM 15. The desired modified data is then available for use by the processor 10 during the execution of its instruction.

Now that the "flush" operation is complete, the BSM controls 30 must be conditioned and restarted in order to execute the WHEREVER type instruction, originally issued by processor 10 and currently stored in CS REG 30a. However, the CS REG 30b must be reset and the system of FIG. 3 must be restarted. To accomplish this objective, the output from the stacked op discriminator circuit 30d energizes one input terminal of AND gate 30e. At this point in the sequence of the functional description of the present invention, the other input terminal of AND gate 30e is energized by the "allow reset BSM controls" signal which occurs at the completion of the "flush" operation. Therefore, the AND gate 30e develops an output signal which sets the stacked op latch 30f, the stacked op latch 30f developing an output signal therefrom on lines 63 and 62. Line 63 provides a restart signal to the BSM ops control circuit 30g, and line 62 provides a reset signal to the CS REG 30b. Via line 62, the flush indication stored in CS REG 30b is removed; and, via line 63, a restart signal is provided to the BSM ops control circuit 30g. Once CS REG 30b is reset and the flush indication is removed, the stacked op discriminator circuit is de-energized and its output "mask" signal 60 disappears. This "un-masks" the BSM ops control circuit 30g such that it now sees the contents of CS REG 30a which contains the WHEREVER type instruction information for processor 10. Therefore, in response to the restart signal, the BSM ops control circuit 30g develops an output signal on line 30c9, energizing the BSM 15, thereby allowing the execution of the WHEREVER type instruction for processor 10 to begin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A multiprocessor system comprising:
   a memory;
   a first processor connected to said memory, said first processor storing data therein;
   a first command status register connected to said first processor, said first command status register for storing normal command information for the execution of instructions by said first processor and flushing command information for the execution of instructions by a second processor;
   said second processor connected to said memory and to said first processor, said seocnd processor requiring access to said data in said first processor to execute an instruction, said second processor causing said first processor to store flushing command information in said first command status register upon the detection of said data in said first processor;

a second command status register connected to said second processor, said second command status register storing normal command information for the execution of instructions by said seocnd processor;

a memory control circuit connected to said memory, said first and said second processor, and said first and said second command status registers, said memory control circuit transferring data between said memory and said first processor in response to said normal command information in said first command status register during the execution of instructions by said first processor, and flushing said data in said first processor to said memory and masking normal command information in said second command status register in response to said flushing command information in said first command status register during the execution of instructions by said second processor.

2. The multiprocessor system of claim 1 wherein said memory control circuit clears said first command status register and unmasks said normal command information in said second command status register in response to the flushing of said data in said first processor to said memory.

3. The multiprocessor system of claim 1 wherein said memory control circuit transfers data between said memory and said second processor in response to said normal command information in said second command status register during the execution of instructions by said second processor.

4. A method of efficiently using command status registers for transferring data between a memory and processors in a multiprocessor system, said multiprocessor system operating in normal mode when the data required by a processor to execute an instruction is located in the respective processor or in said memory, said multiprocessor system operating in flushing mode when the data required by a processor to execute an instruction is located in another processor, said operation in normal mode comprising the steps of:

locating the data required for the excution of instructions by a first processor and locating the data required for the execution of instructions by a second processor;

transferring the data required for the execution of instructions by said first processor between said memroy and said first processor in response to normal command information in a first command status register and transferring the data required for the execution of instructions by said second processor between said memory and said second processor in response to normal command information in a second command status register;

said operation in flushing mode comprising the steps of:

locating the data required for the execution of instructions by said second processor in said first processor;

storing flushing command information in said first command status register; and, flushing the data required for the execution of instructions by said second processor from said first processor to said memory and masking normal command information in said second command status register in response to the flushing command information in said first command status register.

5. The method of claim 4 further comprising the flushing mode step of:

clearing said first command status register of the flushing command information and unmasking the normal command information in said second command status register after the data required for the execution of instructions by said second processor is flushed from said first processor to said memory.

* * * * *